United States Patent [19]
Bruesselbach et al.

[11] Patent Number: 5,761,233
[45] Date of Patent: Jun. 2, 1998

[54] MONOLITHIC PUMP CAVITY AND METHOD

[75] Inventors: Hans Bruesselbach, Calabasas; David S. Sumida, Los Angeles, both of Calif.

[73] Assignee: Hughes Electronics Corporation, El Segundo, Calif.

[21] Appl. No.: 630,395

[22] Filed: Apr. 10, 1996

[51] Int. Cl.$^6$ ................................................ H01S 3/93
[52] U.S. Cl. .............................. 372/72; 372/66; 372/64; 372/70
[58] Field of Search ........................ 372/72, 66, 75, 372/70, 69, 64

[56] References Cited

U.S. PATENT DOCUMENTS

| | | | |
|---|---|---|---|
| 4,860,295 | 8/1989 | Byer et al. | 372/66 |
| 5,349,600 | 9/1994 | Shinbori et al. | 372/66 |
| 5,441,803 | 8/1995 | Meissner | 428/220 |
| 5,572,541 | 11/1996 | Suni | 372/64 |

OTHER PUBLICATIONS

W. Koechner, *Solid–State Laser Engineering*, 3rd edition, Springer Verlage, 1992, pp. 302–316 No month.

*Primary Examiner*—Leon Scott, Jr.
*Attorney, Agent, or Firm*—V. D. Duraiswamy; W. K. Denson-Low

[57] ABSTRACT

A high-Q pump cavity is formed from undoped crystal pieces that are diffusion bonded to a doped core of the same crystal host material. The resulting monolithic pump cavity has 2 opposing convex-curved sides which have a highly-reflective coating on their outer surfaces, except in narrow slit-shaped areas on each curved side through which laser-diode-supplied pump light enters the cavity. The curvature of the two curved sides is such that nearly all the pump light rays that pass through the slit-shaped areas are focussed by the curvature onto the doped core, and rays that enter the cavity are redirected through the doped core many times, resulting in efficient, uniform absorption. The cavity has two opposing flat sides that interface with metal heat sink blocks to facilitate the removal of internally-generated heat. Thermally induced astigmatic lensing caused by this heat is countered by cavity design in which the core shape and the dimensions of the cavity minimize this astigmatism. Embedding a doped crystal core within a crystal of the same material allows the lasing mode size to be larger than the core, allowing the entire doped core to be accessible for efficient extraction, helps reduce parasitic oscillation, and provides highly effective cooling. Furthermore, laser diode light couples directly into the doped core, with close to 100% transport efficiency.

31 Claims, 3 Drawing Sheets

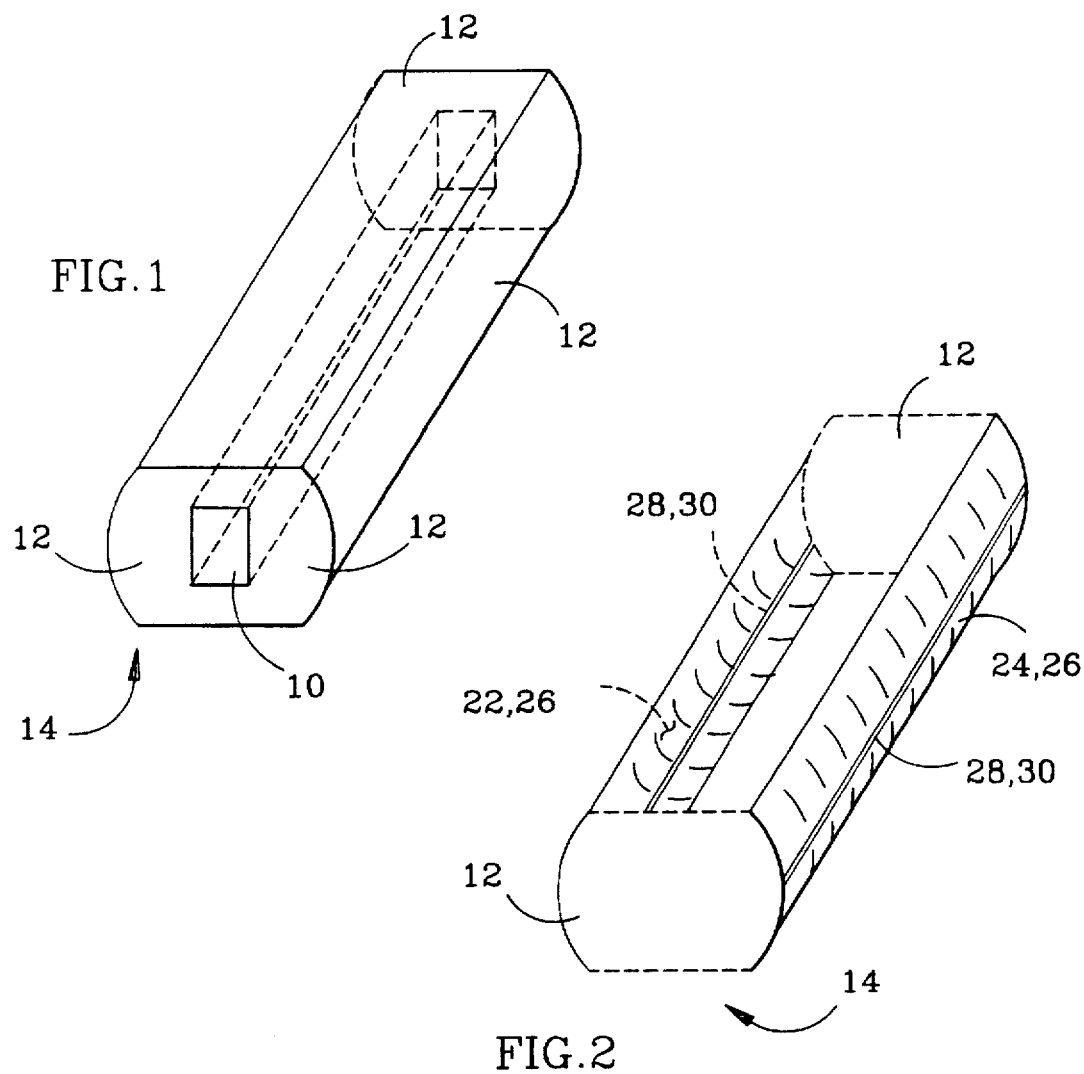
FIG. 1
FIG. 2
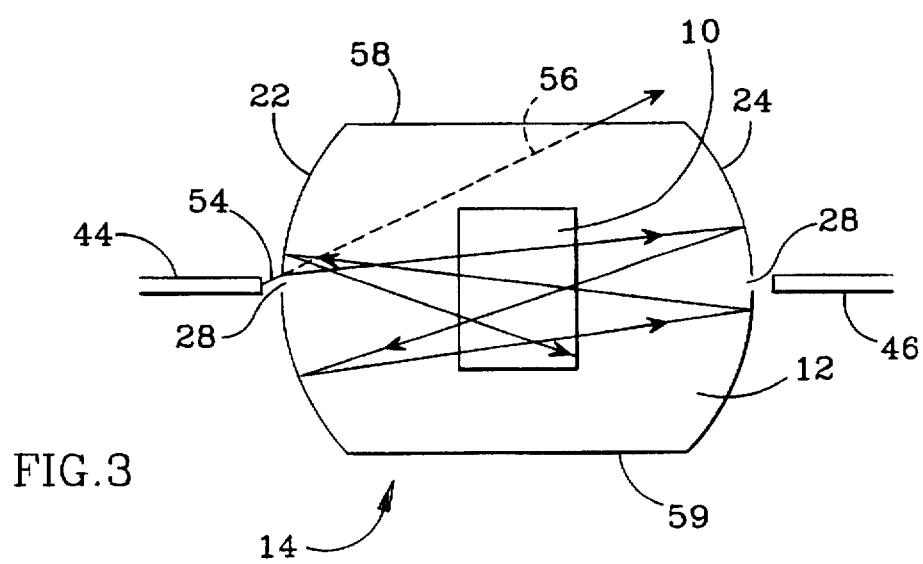
FIG. 3

MONOLITHIC PUMP CAVITY AND METHOD

BACKGROUND OF THE INVENTION

1. Field of the Invention

This invention relates to crystal lasers, and particularly to monolithic crystal pump cavities that are pumped with laser diodes.

2. Description of the Related Art

Crystal lasers, doped with an active ion, often use one or more laser diodes to provide "pump light." The pump light excites ions in the doped crystal to a higher energy state; this process is known as "absorption." A "pump cavity" typically contains a uniformly-doped crystal rod and other elements, such as a pump light reflector. Pump light is coupled into the cavity, typically with one or more laser diodes, either from the side of the cavity, known as "side-pumping," or the end of the cavity, i.e. "end-pumping." A laser is created by placing the doped crystal rod and pump cavity in a "resonator" that reflects photons created by spontaneous emission, i.e. those generated by the normal decay of the excited ions. For example, mirrors placed at either end of the doped crystal rod and aligned perpendicularly to its longitudinal axis form a laser resonator. If the resonator is properly sized and a sufficient number of photons are being reflected back and forth within the resonator so that the "gain" exceeds the "loss," stimulated emission, i.e. "lasing" will occur, producing laser light. Laser light is typically extracted from the doped crystal rod in the pump cavity along the rod's longitudinal axis. Pump cavities are discussed in W. Koechner, *Solid-State Laser Engineering*, 3rd edition, Springer Verlag (1992), ch. 6.

Efficient absorption, in which nearly all of the pump light is absorbed by the doped crystal, is a primary goal of laser designers. Such a low-loss pump cavity is said to have a "high-Q." One method of attaining efficient absorption is by using high-absorption (highly doped) laser materials. A ray of pump light going through a doped crystal one time is known as a "pass." With most existing designs, a pump light ray makes only one or two passes through the doped crystal before escaping, necessitating the use of high-absorption materials to achieve efficient absorption. Absorption is governed by an exponential function. Thus, when such a crystal is side-pumped, non-uniform absorption and thus non-uniform gain often result, with the highest gain being near the crystal edge. To facilitate handling, the corners of a crystal will typically be chamfered. The chamfer will shadow or block the laser light, and since the highest gain is at the edges of the crystal, inefficient lasing results.

Another approach to the goal of high efficiency absorption uses end pumping, in which pump light comes into a pump cavity along its longitudinal axis. End pumping requires expensive high-brightness pump diodes and durable, difficult-to-produce dichroic coatings since the pumping and laser light extraction takes place through the same optical surfaces (i.e. the ends of the crystal rod) while requiring quite different reflectivity characteristics. In the case of quasi-four-level or three-level laser systems, pump "bleaching" can occur, in which available ions have been excited and no further pump light absorption is possible, resulting in reduced absorption for both side- and end-pumping geometries.

Efficiently coupling pump light into a pump cavity presents problems as well. For example, lenses, fibers, non-imaging concentrators, or some combination of these have been used to couple laser diode light into a doped crystal. These devices all introduce pump light losses, size, weight, cost and complexity to the resulting pump cavity.

Another common problem found in crystal pump cavities occurs when the heat generated by the optical processes occurring within a doped crystal causes astigmatic thermally induced lensing to occur in the cavity. This astigmatism can make lasing more difficult, and the quality of the output beam poor.

Parasitic oscillation can also occur in existing designs, in which unwanted and inefficient lasing occurs in directions other than the desired longitudinal direction, due to laser light being reflected off the pump cavity walls or the doped crystal's surfaces.

Another problem found with laser mediums that are uniformly doped is a "lasing mode size," i.e. the amount of area occupied by the laser photons, that is smaller than the size of the doped crystal, causing a loss of efficiency.

SUMMARY OF THE INVENTION

A high-Q pump cavity is presented that features an undoped outer crystal which has embedded within it a doped core of the same crystal host material, thereby integrating the functions of a doped crystal and a pump cavity into an essentially monolithic device. This integrated doped crystal/pump cavity, referred to hereinafter as a "pump cavity," provides efficient and uniform absorption, uniform gain, a lasing mode size that is larger than the core and thus allows the entire doped core to be available for efficient extraction, and significantly reduced parasitic oscillation. Small size, simplicity, and a low parts count are also features of the invention.

A crystal is doped with a laser active dopant such as a rare-earth or transition-metal ion to form a "doped core." Undoped pieces of the same crystal material are diffusion bonded to the core, forming a homogeneous monolithic pump cavity with an undoped "outer crystal" that has a doped core embedded within it. The cavity is preferably rod-shaped, and has two opposing convex-curved sides running along its full length. The curved sides are coated with a highly-reflective dielectric coating. At least one of the curved sides has a narrow slit-shaped area that is preferably coated with an anti-reflective coating. Pump light is preferably supplied by at least one laser diode located adjacent to the slit-shaped area, through which pump light enters the cavity.

The curvatures of the cavity's two curved sides are chosen to provide two functions. First, the curvature is such that nearly all the pump light rays that pass through the slit-shaped area are deflected through the doped core. Second, the curvature is adjusted so that pump light rays that enter the cavity are redirected through the doped core many times. The pump light rays make many more passes through the core than does pump light in conventional diode pumping architectures, resulting in efficient, uniform absorption. This efficiency permits the use of conventional, low brightness laser diodes to provide pump light, as well as low absorption laser materials.

The pump cavity preferably has two opposing flat sides in addition to the two opposing curved sides. The flat sides interface with metal heat sink blocks to facilitate the removal of heat generated by the optical processes occurring within the cavity. Such heat can cause thermally induced lensing, possibly astigmatic, to occur in the cavity. The tendency to astigmatism is countered in the present invention by a cavity design in which the doped core shape and the dimensions of the cavity minimize the astigmatism.

primarily spherical lensing is provided in the area of the device occupied by the lasing mode.

The novel technique of embedding a doped crystal core within an outer crystal of the same host material, as presented herein, allows the lasing mode size to be larger than the core and thus allows the entire core to be accessible for efficient extraction. This innovation also helps reduce parasitic oscillation and provides highly effective cooling. Furthermore, laser diode light couples directly into the doped core, with close to 100% transport efficiency.

Further features and advantages of the invention will be apparent to those skilled in the art from the following detailed description, taken together with the accompanying drawings.

DESCRIPTION OF THE DRAWINGS

FIG. 1 is a perspective view of a preferred pump cavity.

FIG. 2 is a perspective view of the coatings applied to the curved pump cavity surfaces of FIG. 1, with the rest of the pump cavity indicated in dashed lines and the core not shown.

FIG. 3 is a front elevation view and light ray schematic of the preferred pump cavity.

DETAILED DESCRIPTION OF THE INVENTION

Figure 4:
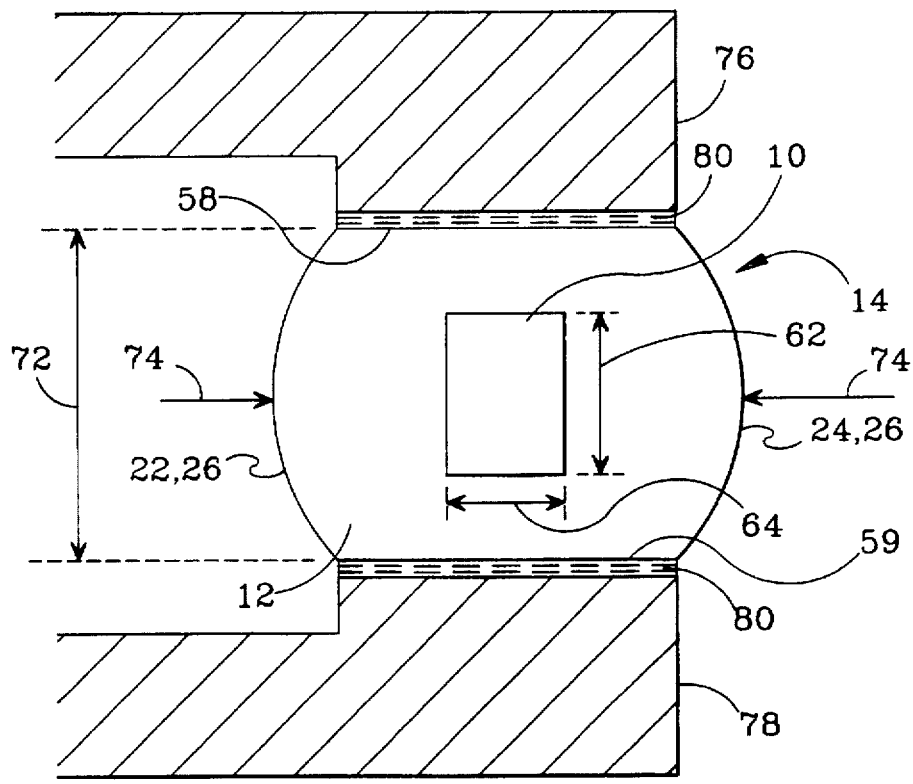
FIG. 4 is a front elevation view of the preferred pump cavity and additional components associated with the cavity's use.

A monolithic high-Q pump cavity that is limited in size, complexity and parts count is presented which provides highly efficient absorption of pump light.

A preferred pump cavity is shown in FIG. 1. A rod-shaped crystal core 10, preferably yttrium-aluminum-garnet (YAG), is doped with a rare-earth ion, preferably ytterbium ($Yb^{3+}$), to make a "doped core." The doped core is then diffusion bonded to undoped pieces of YAG 12, referred to herein as the "outer crystal," to form a rod-shaped monolithic pump cavity 14. The doped core 10 is preferably rectangular and runs the length of the cavity. Cores with other shapes may be used, as long as the proper analysis as described herein is performed so that the performance advantages of the invention can be realized. When the doped core 10 and the undoped outer crystal 12 are properly configured, as discussed below, a pump cavity 14 is created having many advantages over existing designs.

As shown in FIG. 2, the cavity 14 preferably has two opposing curved sides 22, 24 that run the full length of the cavity along its longitudinal axis (doped core not shown). The outer surfaces of the two curved sides 22, 24 are coated with a high-reflectivity dielectric coating 26, with the exception of a narrow slit-shaped area 28 that runs down the center of at least one, and preferably both, of the two curved sides. Pump light enters the pump cavity through the slit-shaped areas 28, which are therefore not given a highly-reflective coating. Preferably, these areas receive a coating 30 that is anti-reflective at the wavelength of the pump light, to minimize pump light losses.

In FIG. 3, a source of pump light is placed adjacent to the narrow slit-shaped areas 28 (shown as apertures in FIG. 3, though they are actually areas of the undoped crystal surface, as described above). Preferably, laser diodes 44, 46 in the form of multiple-emitter bars are used to supply pump light. The diodes 44, 46 are abutted as close as practical to the curved sides 22, 24, preferably within 50 microns.

The curvature of each curved side is chosen to provide two functions. First, the curvature is such that rays of light emitted from a laser diode 44, 46 are deflected through the doped core 10. Light rays are typically emitted from a laser diode at angles of up to approximately ±22.5 degrees up-and-down and ±5 degrees side-to-side with respect to the diode's longitudinal axis. The more rays that can be made to pass through the doped core 10, the greater the absorption efficiency of the pump cavity. The deflection provided by the curved sides 22, 24 of the cavity 14 enables virtually all of the light rays emitted by the diodes to pass through the doped core.

A second function provided by the curved sides is to reflect incoming pump light rays so that they are repeatedly redirected through the doped core 10. FIG. 3 depicts the path taken by one incoming light ray 54 emitted from laser diode 44. Ray 54 is emitted at an angle shown by ray path 56 that, if not deflected, would take it through the outer crystal 12 without passing through the doped core 10 at all. The curved side 22 deflects ray 54 by refraction as it passes through the slit-shaped area 28 so that it continues through the doped core 10. The curvature of the opposite curved side 24 is such that ray 54 reflects from the highly-reflective coating and back through the doped core. Ray 54 then reflects from curved side 22 and through the doped core 10 again. The ray 54 continues to reflect back and forth through the doped core until its photons are absorbed. An incoming ray will make an average of 5–10 passes. This large number of passes enables nearly all of the ray's energy to be absorbed.

This process is repeated for nearly all rays emitted by laser diodes 44, 46. The diodes couple directly into the doped core 10 with close to 100% transport efficiency, without the use of lenses, fibers or non-imaging concentrators, for example, and their associated losses, weight, complexity and cost. With the high number of passes made by each ray, lower absorption laser materials can be used, enabling the side pumping to be efficient and uniform, even with relatively low-brightness diode bars. An improved absorption efficiency also helps to compensate for the reduced absorption coefficient that occurs with bleaching.

Appropriate cavity configurations that provide both the incoming-ray deflection and reflecting functions discussed above can be empirically determined by modeling a particular cavity design with a ray-tracing computer program and noting its performance. Then, one or more parameters that affect the performance, such as the curvature of one or both sides, the size and placement of the doped core, the nature of the crystal material and the wavelength of the pump light are varied and the resulting performance modeled. This process continues until an acceptable design is determined. The curvatures need not be the same on both sides and are not restricted to any particular values. Nor is it required that the origin of either curve be in the center of the cavity. The invention is not limited to a spherical curvature, but such a curvature is preferred. A particular cavity configuration may be best served by an elliptical curvature, for example.

The characteristics of the coatings on the surfaces of the curved sides are very important. Except along the slit-shaped areas, they should be highly reflective, i.e. reflecting more than 99% of an impinging ray at the wavelength of the pump light, to prevent pump light from being lost once it enters the cavity. This coating should also have a low reflectivity at the lasing and other potential high-gain wavelengths. An anti-reflective coating is preferably used in the narrow slit-shaped areas, that is highly anti-reflective, preferably reflecting less than 0.25% of an impinging ray at the wavelength of the pump light, to allow as much pump light as possible to enter the pump cavity. An anti-reflective coating should also be applied to the longitudinal ends of the cavity. This coating should be highly anti-reflective at the wavelength of the laser light that will be extracted from the cavity. These types of dielectric coatings can be obtained from Z.C. & R., Inc., Los Angeles.

The doped core is preferably diffusion bonded to the undoped outer crystal, producing a homogeneous pump cavity. Diffusion bonding is a method of physically bonding two optical materials together so that they become a single piece, with no bonding agent, such as glue or epoxy, in the interface to hold them together. It is performed at elevated temperatures with the surfaces being bonded pre-polished to a high degree of flatness. Diffusion bonding is described in U.S. Pat. No. 5,441,803, "Composites made from single crystal substances," to Meissner. Other methods of bonding optical materials together are acceptable, as long as the resulting cavity is as if it were formed from a single piece of material.

This novel crystal structure provides a pump cavity with many advantages. Highly effective cooling of the doped core is possible, for example, as the outer crystal efficiently conducts heat to its surfaces, where it can be carried away (discussed further below). Embedding the doped core within an outer crystal provides a high-Q pump cavity. The homogeneity of the cavity allows the lasing mode size to be larger than the core, which in turn allows the entire doped core to be accessible for efficient extraction. There is also no vignetting, clipping or guiding of the laser light, as the lasing mode does not come close to the edges of the outer crystal. Also, embedding the potentially fragile doped crystal inside the larger undoped outer crystal makes handling the small cavity easier.

Parasitic oscillation is also largely defeated by embedding the core in this way. Since both the core and the outer crystal are the same material, the index of refraction is practically equal for the two regions. This nearly eliminates any total internal reflection (TIR) that is normally present at the boundary of two materials with different indices, and also avoids refractive effects that could interfere with the pump rays passing through the core after each reflection from one of the curved sides. Reducing TIR in turn reduces the occurrence of parasitic oscillation.

Another novel feature of the present invention involves the cavity's handling of heat. It is necessary to cool the cavity because a significant amount of heat is generated by the optical processes occurring within the pump cavity. To accomplish this, some form of heat sinking must be used, requiring physical contact with the outer crystal. The cavity's two opposing curved sides are used to admit and reflect pump light; attaching heat sinks to them would interfere with the adjacent pump light sources. Thus, heat can only be removed from the sides of the cavity not being used to redirect pump light. Preferably, the cavity's opposed sides 58, 59 between its curved sides 22, 24 are flat, making it easy for them to interface with metal heat sink blocks, though non-flat surfaces could be used as well. Because heat can only be removed from the top and bottom of the cavity through the flat sides, thermally induced astigmatic lensing may occur. The invention compensates for this phenomenon by selecting a shape for the doped core and dimensions for the cavity as a whole to reduce astigmatism. This causes lensing in the area of the device occupied by the lasing mode to be primarily spherical, with sharply reduced astigmatism. Determining the appropriate core shape and cavity dimensions can be accomplished empirically using a computer simulation to model a cavity with an initial core shape and cavity size, calculating the temperature distribution and astigmatism in the cavity, and manipulating the core shape and cavity size to obtain largely spherical isotherms in the area of the doped core, to reduce the calculated astigmatism; varying the core height and width will generally have the greatest effect on astigmatism.

The invention as described is applicable to a wide range of pump cavity configurations. It may be used with many different crystal and dopant types, including $Yb^{3+}$:YAG, $Nd^{3+}$:YAG and $Cr^{3+}$:$Al_2O_3$. It is preferred that pieces of a chosen crystal be capable of being diffusion bonded to each other.

The invention is not limited to any particular dopant level. However, because each incoming pump light ray makes a high number of passes through the doped core, the use of lower absorption laser materials and lower brightness laser diodes than might be practical with a one or two pass design is enabled.

Different sources of pump light may be used with the invention. It is only necessary that the reflective and anti-reflective coatings used on the curved sides of the cavity be matched to the wavelength of the pump light source used.

Figure 5:
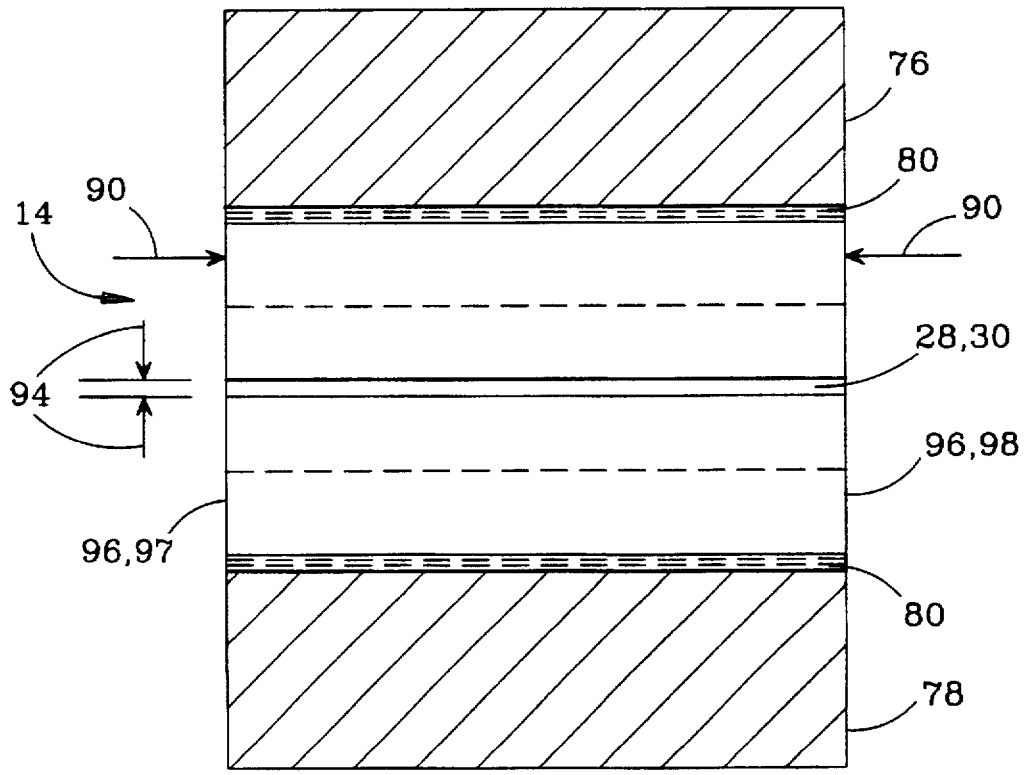
FIG. 5 is a side elevation view of the preferred pump cavity and associated components of FIG. 4.
Figure 6:
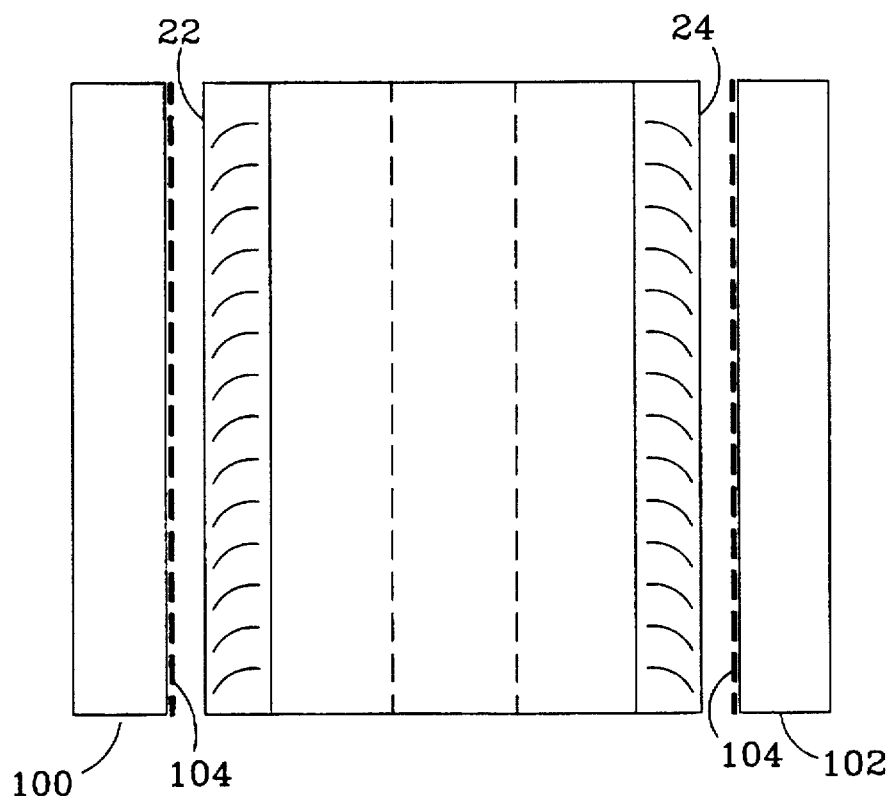
FIG. 6 is a plan view of the preferred pump cavity and additional components associated with the cavity's use.

A pump cavity 14 with the features discussed herein has been fabricated, and is shown in detail in FIGS. 4, 5 and 6. The preferred outer crystal 12 and core crystal 10 host material is YAG, and the preferred dopant is $Yb^{3+}$, with a doping level of about one atomic percent. The doped core 10 has a height 62 of about 400 microns and a width 64 of about 300 microns, which provides a low amount of thermally induced astigmatism. The core 10 is centrally located within the cavity 14, and runs the entire length of the cavity, which is about 1 cm long.

For this cavity, a spherical curvature was determined to provide the best performance. The radius of curvature for each of the curved sides 22, 24 is about 0.9 mm, which provides between 5 and 10 passes for incoming pump light rays. Each curved side 22, 24 has a highly-reflective dielectric coating 26 on it (except in the narrow slit-shaped areas, discussed below). The coating is highly-reflective at the wavelength of the pump light, which in this embodiment is about 940 nm, and has a low reflectivity at about 1030 nm, which is the wavelength of the laser light extracted from the cavity. The overall height 72 of the cavity is about 1 mm, and its width 74 at its widest point is about 1.5 mm.

Heat produced in the pump cavity must be removed. It is preferred that this be accomplished with heat sink blocks 76, 78, preferably made of copper and water cooled. The blocks interface to the cavity along its full length through a thin layer 80 of indium. The flat sides 58, 59 of the cavity are preferably finely ground, and the layer of indium is placed between the flat sides and the metal blocks. The indium provides good thermal contact between crystal and blocks, and also acts as a cushioning layer, to reduce strain on the crystal. These flat surfaces, being finely ground and in contact with the metal heat sink blocks, are not highly reflecting, and thus serve to aid in suppression of parasitic oscillation.

FIG. 5 is a side view of the same cavity shown in FIG. 4. The cavity's length 90 is about 1 cm. In this view, one of the narrow slit-shaped areas 28 can be seen. The height 94 of the slit-shaped area 28 is about 75 microns, and the area runs the full length of the cavity. The area 28 has an anti-reflective coating 30 that is highly anti-reflective at the wavelength of the pump light, which is about 940 nm. There is a slit-shaped area on the opposing curved side with approximately the same dimensions and coating characteristics.

A coating 96, highly anti-reflective at the wavelength of the laser light extracted from the cavity 14, was applied to the longitudinal ends 97, 98 of the cavity.

FIG. 6 is a plan view of the same cavity shown in FIGS. 4 and 5, with the heat sink blocks not shown. It is preferred that laser diodes be used to provide pump light to the cavity. Two laser diode bars 100, 102 are located on either side of the cavity's curved sides 22, 24, in alignment with the narrow slit-shaped areas 28 on each side. The diode bars 100, 102 run the full length of the cavity. The laser diode bars typically have 25 individual emitters 104, with each bar having a total emitting area of about 1 micron by 1 cm. The diode bars 100, 102 are each about 50 microns from their respective curved sides. The diodes are commonly available InGaAs diodes, and produce light at a wavelength of about 940 nm. While two diode bars are used in this embodiment, the advantages provided by the invention would be present if more or less diodes were used, or if pump light were admitted through just one of the cavity's curved surfaces. However, the power output of the device would be correspondingly increased or reduced. Other types of pump light sources would also be acceptable; however, cavity parameters such as coating specifications, dopant and curvature would need to be adjusted to accommodate a different pump light wavelength.

Figure 7:
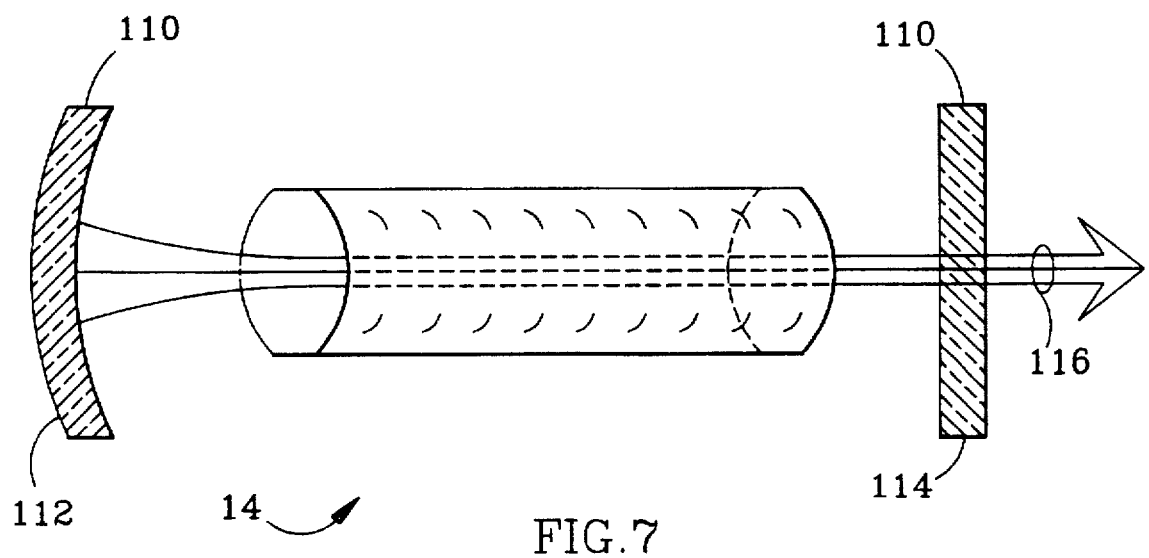
FIG. 7 is a perspective view of the preferred pump cavity as a component of a crystal laser, with the laser diodes and heat sink blocks not shown.

By placing the present pump cavity within a resonator 110, as shown in FIG. 7, a laser can be made. A resonator typically consists of a 100% reflector 112 and a partial reflector 114, with the distance between reflectors selected to provide laser light at a particular wavelength. Laser light 116 emerges from the resonator 110 through partial reflector 114. The invention can be used as a component for many types of lasers, including q-switched, continuous wave, mode-locked and normal mode types. A q-switched laser was fabricated using the pump cavity shown in FIGS. 4, 5 and 6. This laser had a power output of about 5 watts. Other applications for the pump cavity include its use as a master oscillator for a multi-kilowatt master oscillator power amplifier, a master oscillator for industrial laser power amplifiers (operating long-pulsed), and a pump for fiber lasers as might be used as laser radar sources.

While particular embodiments of the invention have been shown and described, numerous variations and alternate embodiments will occur to those skilled in the art. Accordingly, it is intended that the invention be limited only in terms of the appended claims.

We claim:

1. A pump cavity, comprising:

a core formed from a crystal material that has been doped with an active ion, said core having a shape that produces a low value of thermally induced astigmatic lensing, an undoped outer crystal formed from the same type of crystal material as said core and forming with said core a monolithic high-Q pump cavity, said outer crystal having two opposing curved sides along a longitudinal axis, at least one of said curved sides having a narrow longitudinal slit-shaped area for admitting pump light into said cavity, and two opposing flat sides between said curved sides to facilitate heat removal from said cavity, and highly-reflective coatings on both of said curved sides except in said slit-shaped areas, the curvature of said curved sides directing said pump light entering said cavity via said slit-shaped areas through said core, and said reflective coatings repeatedly redirecting said pump light through said core.

2. The pump cavity of claim 1, wherein said crystal is yttrium-aluminum-garnet.

3. The pump cavity of claim 1, wherein said outer crystal has a shape that produces a low value of thermally induced astigmatic lensing.

4. The pump cavity of claim 1, further comprising at least one laser diode positioned to direct narrow waveband pump light into said cavity through one of said narrow slit-shaped areas.

5. The pump cavity of claim 1, further comprising a plurality of laser diodes positioned to direct pump light into said cavity through said narrow slit-shaped areas on both curved sides of said cavity.

6. The pump cavity of claim 1, further comprising a first laser diode bar adjacent to said narrow slit-shaped area on one of said curved sides, and a second laser diode bar adjacent to said narrow slit-shaped area on the other of said curved sides, each of said laser diode bars having multiple emitters positioned to direct pump light into said cavity through the narrow slit-shaped areas on their respective curved sides of the cavity.

7. The pump cavity of claim 1, wherein each of said curved sides has a radius of about 0.9 mm.

8. The pump cavity of claim 1, wherein each of said narrow slit-shaped areas is about 75 microns high.

9. The pump cavity of claim 1, wherein said pump cavity is about 1 cm long, with said outer crystal, said core, and said narrow slit-shaped areas each about 1 cm long.

10. The pump cavity of claim 1, further comprising at least one laser diode providing pump light at a wavelength of about 940 nm into said cavity through at least one of said narrow slit-shaped areas.

11. The pump cavity of claim 10, wherein said laser diodes are InGaAs laser diodes.

12. The pump cavity of claim 10, wherein said pump cavity produces laser light at a wavelength of about 1030 nm.

13. The pump cavity of claim 1, wherein said core provides a lasing mode size within said outer crystal that is larger than said core, enabling substantially the entire doped core to be accessible for efficient extraction of laser light from the cavity.

14. The pump cavity of claim 1, further comprising thermally conductive blocks affixed to said cavity for removing heat generated within the cavity.

15. The pump cavity of claim 14, further comprising a layer of indium between said blocks and said cavity, for improving thermal contact and providing a cushion between said cavity and said blocks.

16. A pump cavity, comprising:

a core formed from a crystal material that has been doped with an active ion, wherein said active ion is ytterbium, an undoped outer crystal formed from the same type of crystal material as said core and forming with said core a monolithic high-Q pump cavity, said outer crystal having two opposing curved sides along a longitudinal axis, at least one of said curved sides having a narrow longitudinal slit-shaped area for admitting pump light into said cavity, and highly-reflective coatings on both of said curved sides except in said slit-shaped areas, the curvature of said curved sides directing said pump light entering said cavity via said slit-shaped areas through said core, and said reflective coatings repeatedly redirecting said pump light through said core.

17. A pump cavity, comprising:

a core formed from a crystal material that has been doped with an active ion, an undoped outer crystal formed from the same type of crystal material as said core and forming with said core a monolithic high-Q pump cavity, said outer crystal having two opposing curved sides along a longitudinal axis, at least one of said curved sides having a narrow longitudinal slit-shaped area for admitting pump light into said cavity, and highly-reflective coatings on both of said curved sides except in said slit-shaped areas, the curvature of said curved sides directing said pump light entering said cavity via said slit-shaped areas through said core, and said reflective coatings repeatedly redirecting said pump light through said core, wherein said core and said outer crystal are diffusion bonded together.

18. A pump cavity comprising:

a core formed from a crystal material that has been doped with an active ion, an undoped outer crystal formed from the same type of crystal material as said core and forming with said core a monolithic high-Q pump cavity, said outer crystal having two opposing curved sides along a longitudinal axis, at least one of said curved sides having a narrow longitudinal slit-shaped area for admitting pump light into said cavity, and highly-reflective coatings on both of said curved sides except in said slit-shaped areas, the curvature of said curved sides directing said pump light entering said cavity via said slit-shaped areas through said core, and said reflective coatings repeatedly redirecting said pump light through said core, and further comprising at least one laser diode positioned to direct narrow waveband pump light into said cavity through one of said narrow slit-shaped areas, wherein said narrow slit-shaped areas have an anti-reflective coating that is highly anti-reflective at a wavelength approximately equal to that of said pump light.

19. A pump cavity comprising:

a core formed from a crystal material that has been doped with an active ion, an undoped outer crystal formed from the same type of crystal material as said core and forming with said core a monolithic high-Q pump cavity, said outer crystal having two opposing curved sides along a longitudinal axis, at least one of said curved sides having a narrow longitudinal slit-shaped area for admitting pump light into said cavity, and highly-reflective coatings on both of said curved sides except in said slit-shaped areas, the curvature of said curved sides directing said pump light entering said cavity via said slit-shaped areas through said core, and said reflective coatings repeatedly redirecting said pump light through said core, and further comprising at least one laser diode positioned to direct narrow waveband pump light into said cavity through one of said narrow slit-shaped areas, said cavity configured to produce a stimulated emission of light at a predetermined emission wavelength in response to said pump light, wherein said highly-reflective coatings on said curved sides have a high reflectivity at a wavelength approximately equal to that of said pump light, for repeatedly redirecting said pump light through said core, and a low reflectivity at a wavelength approximately equal to that of said stimulated emission, for suppressing parasitic oscillations and amplified spontaneous emissions.

20. A pump cavity comprising:

a core formed from a crystal material that has been doped with an active ion, an undoped outer crystal formed from the same type of crystal material as said core and forming with said core a monolithic high-Q pump cavity, said outer crystal having two opposing curved sides along a longitudinal axis, at least one of said curved sides having a narrow longitudinal slit-shaped area for admitting pump light into said cavity, and highly-reflective coatings on both of said curved sides except in said slit-shaped areas, the curvature of said curved sides directing said pump light entering said cavity via said slit-shaped areas through said core, and said reflective coatings repeatedly redirecting said pump light through said core, and further comprising at least one laser diode positioned to direct narrow waveband pump light into said cavity through one of said narrow slit-shaped areas, said cavity configured to produce a stimulated emission of light at a predetermined emission wavelength in response to said pump light, wherein the longitudinal ends of said cavity have a coating that is highly anti-reflective at a wavelength approximately equal to that of said stimulated emission.

21. A pump cavity comprising:

a core formed from a crystal material that has been doped with an active ion, an undoped outer crystal formed from the same type of crystal material as said core and forming with said core a monolithic high-Q pump cavity, said outer crystal having two opposing curved sides along a longitudinal axis, at least one of said curved sides having a narrow longitudinal slit-shaped area for admitting pump light into said cavity, and two opposing flat sides between said curved sides to facilitate heat removal from said cavity, highly-reflective coatings on both of said curved sides except in said slit-shaped areas, the curvature of said curved sides directing said pump light entering said cavity via said slit-shaped areas through said core, and said reflective coatings repeatedly redirecting said pump light through said core, wherein said core has a rectangular cross section transverse to the cavity's longitudinal axis.

22. The pump cavity of claim 21, wherein said core is about 400 microns high and about 300 microns wide.

23. The pump cavity of claim 22, wherein the distance between said flat sides is about 1 mm and the distance between said curved sides at their point of maximum separation is about 1.5 mm.

24. A pump cavity with an embedded core, comprising:

an outer crystal, and a core formed from a crystal of the same material as said outer crystal and doped with an active ion, said core embedded within said outer crystal to form a monolithic, homogeneous high-Q pump cavity, said outer crystal enabling highly effective conductive cooling of said core and enabling a lasing mode size that is larger than said core, said outer crystal reducing the occurrence of parasitic oscillation, beam vignetting, clipping, or guiding.

25. A pump cavity with an embedded core, comprising:

an outer crystal, and a core formed from a crystal of the same material as said outer crystal and doped with an active ion, said core embedded within said outer crystal to form a monolithic, homogeneous high-Q pump cavity, said outer crystal enabling highly effective conductive cooling of said core and enabling a lasing mode size that is larger than said core, said outer crystal reducing the occurrence of parasitic oscillation, beam vignetting, clipping, or guiding, wherein said core and said outer crystal are diffusion bonded together.

26. A pump cavity with primarily spherical lensing, comprising:

a doped crystal core, and an outer crystal bonded to said core forming a pump cavity, wherein said core and said outer crystal have shapes that provide primarily spherical lensing and a low value of thermally induced astigmatism.

27. The pump cavity of claim 26, wherein said core has a rectangular cross section transverse to said cavity's longitudinal axis and is approximately centered within said outer crystal.

28. A pump cavity with primarily spherical lensing, comprising:

a doped crystal core, and an outer crystal bonded to said core forming a pump cavity, wherein said core and said outer crystal have shapes that provide primarily spherical lensing and a low value of thermally induced astigmatism, wherein said core has a rectangular cross section transverse to said cavity's longitudinal axis and is approximately centered within said outer crystal, and wherein said core is about 400 microns high and about 300 microns wide, said outer crystal having two curved sides in which each side has a radius of about 0.9 mm and the two curved sides are about 1.5 mm apart at the point of greatest separation, said outer crystal further comprising two flat sides between said curved sides that are about 1 mm apart.

29. A monolithic laser diode-pumped crystal laser, comprising:

a pump cavity in which a doped crystal core is bonded to outer crystal pieces of the same crystal host material to form a monolithic homogeneous pump cavity with an embedded doped core, said cavity having two opposing convex-curved sides, at least one of said sides having a narrow slit-shaped area through which pump light enters said cavity, said sides having a highly-reflective coating on their outer surfaces except in said slit-shaped areas, the curvature of said convex-curved sides such that said pump light entering said cavity is deflected through said core and repeatedly redirected through said core for providing efficient absorption of said pump light, said core and said outer crystal having shapes that produce a low value of thermally induced astigmatic lensing, said outer crystal enabling conduction of heat away from said core, a lasing mode size that is larger than said core, and reduced occurrence of parasitic oscillations, beam vignetting, clipping, or guiding.

at least one laser diode providing said pump light into said cavity through said slit-shaped areas, and a resonator, said resonator aligned with the longitudinal ends of said pump cavity such that stimulated emission occurs within said cavity.

30. A method of empirically selecting, using computer simulation, dimensions of a doped core and undoped outer crystal of a pump cavity so as to reduce thermally induced astigmatism in the pump cavity, comprising the steps of:

modeling a pump cavity having a doped core embedded in an undoped outer crystal with a computer program that can calculate temperature distribution and display isotherms, predicting the temperature distribution in the cavity when the cavity is producing laser light, varying the dimensions of the doped core and outer crystal while monitoring the temperature distribution isotherms until largely spherical isotherms are present in the area of the doped core, and selecting the dimensions of the doped core and outer crystal which result in largely spherical isotherms being present in the area of the doped core.

31. A method of designing a laser pump cavity to enhance the number of passes a pump light ray makes through a doped core, comprising the steps of:

modeling a pump cavity having a doped core embedded in an undoped outer crystal having two curved sides with a ray-tracing computer program, determining how many passes are made through said core by a light ray entering said cavity, and varying the curvature and spacing of said cavity's sides to increase the number of times said light ray passes through said core.

* * * * *